United States Patent
Goudezeune et al.

(10) Patent No.: US 6,366,314 B1
(45) Date of Patent: Apr. 2, 2002

(54) METHOD AND SYSTEM FOR MEASURING THE QUALITY OF DIGITAL TELEVISION SIGNALS

(75) Inventors: Gabriel Goudezeune, Metz; Jamal Baina, Nancy; Philippe Hocquard, Tomblaine; Denis Masse, Rosselange, all of (FR)

(73) Assignee: Telediffusion De France, Paris (FR)

(*) Notice: Subject to any disclaimer, the term of this patent is extended or adjusted under 35 U.S.C. 154(b) by 0 days.

(21) Appl. No.: 09/554,942
(22) PCT Filed: Dec. 14, 1998
(86) PCT No.: PCT/FR98/02717
  § 371 Date: May 22, 2000
  § 102(e) Date: May 22, 2000
(87) PCT Pub. No.: WO99/31891
  PCT Pub. Date: Jun. 24, 1999

(30) Foreign Application Priority Data

Dec. 17, 1997 (FR) .............................. 97 16003

(51) Int. Cl.[7] .............................................. H04N 17/00
(52) U.S. Cl. ....................................... 348/192; 348/194
(58) Field of Search ................................. 348/180, 181, 348/184, 192, 189, 194; H04N 17/00

(56) References Cited

U.S. PATENT DOCUMENTS 5,473,385 A    12/1995   Leske
5,600,632 A    2/1997    Schulman
5,699,392 A    12/1997   Dokie

FOREIGN PATENT DOCUMENTS

| EP | 624983 | 11/1994 |
|----|--------|---------|
| EP | 786883 | 7/1997 |
| WO | WO 95/33338 | 12/1995 |

OTHER PUBLICATIONS

Shulman, M.A.; "End–to–End Performance Measurement for Interactive Multimedia Television"; Proceedings of the International Test Conference (ITC), Oct. 21–25, 1995, pp. 979–985, XP000552905; Washington.

*Primary Examiner*—Sherrie Hsia
(74) *Attorney, Agent, or Firm*—Alston & Bird LLP

(57) ABSTRACT

The invention relates to a method and to a system for measuring the quality of digital television signals comprising a data stream, the method including measuring quality and producing measurement signals that are representative of quality. The method comprises the following steps: a) selecting a reference time signal (PCR) from the data stream; b) generating a multibit digital clock signal (STC') from the reference time signal, the phase of the clock signal being locked on the basis of the reference time signal (PCR) and its count being deduced unambiguously from the count of an initial time base (STC); and c) labelling the measurement signals with at least some of the bits (HDT) of the digital clock signal that are meaningful given the nature of the measurements performed.

11 Claims, 3 Drawing Sheets

METHOD AND SYSTEM FOR MEASURING THE QUALITY OF DIGITAL TELEVISION SIGNALS

FIELD OF THE INVENTION

The present invention relates to a method and a system for measuring the quality of digital television signals, and it is more particularly intended to managing the quality of service of a network for distributing digital audiovisual signals.

In order to be able to supervise a distribution network effectively, it is necessary to make use of quality measurements performed on various signals in the network, said signals serving to transport and broadcast audiovisual signals.

SUMMARY OF THE INVENTION

An object of the present invention is to provide a system making such supervision possible, without giving rise to additional complication, and without having to take account of characteristics that are specific to digital systems, for example the characteristic of the MPEG-2 system whereby the images of a sequence are not transmitted in the same order as they will be seen on a screen (the images I are transmitted, and then the images P, and finally the images B from a group of images GOP).

The invention is based on the idea of using a reference time signal that is already present in the data stream to label measurements.

The invention thus provides a method of measuring the quality of digital television signals comprising a data stream, said method including measuring quality and producing measurement signals representative of the quality of at least some of the data of the data stream, and being characterized in that it comprises the following steps:

a) selecting a reference time signal from the data stream;
b) generating a multibit digital clock signal on the basis of the reference time signal, with the phase of the clock signal being locked on the basis of said reference time signal, and with the count thereof being deduced unambiguously from the count of a time base generated during initial encoding of the digital television signals; and
c) labelling said measurement signals using at least some of the bits of the digital clock signal, that are meaningful given the nature of the measurements performed.

Advantageously, step a) comprises the following substeps:

$a_1$) selecting digital frames corresponding to video data associated with a program from said data stream; and
$a_2$) selecting said reference time signal from said frames.

By way of example, the digital television signals are in the MPEG-2 standard and, during step $a_1$), frames are selected on the basis of the PID field.

Preferably, the video data is the data on which audio and/or video quality measurements are performed. In which case, the method may include a step of decoding video data from frames selected on the basis of said PID field.

The selection of the reference time signal may be performed by testing a flag indicating the presence of said reference time signal in each frame under consideration.

For digital television signals in the MPEG-2 standard, the reference time signal can be the signal PCR, the signal SCR, the signal DTS, or indeed the signal PTS. Advantageously, during step b), said digital clock signal is at a frequency of k×27 MHz where k is a non-zero integer or fraction.

The invention also provides a system for measuring the quality of signals in a digital television network having a plurality of transmission installations, the system being characterized in that it includes a plurality of measurement equipments associated with at least some of the transmission installations, and each of which comprises:

an identifier device receiving the data stream as input and outputting a reference time signal selected from the data stream;
a clock generator whose phase is locked on the basis of said reference time signal and which outputs a multibit digital clock signal operating at a given frequency, and whose count is deduced unambiguously form the count of a time base generated while encoding the digital television signals;
a device for labelling quality measurements using at least the meaningful bits of the multibit digital clock signal; and
a device for transmitting the labelled quality measurements: and in that it includes a receiver for collecting the labelled measurement data transmitted by at least one of said transmission devices.

Preferably, the count of the multibit digital clock signal is equal to the count of said time base.

The labelling procedure of the invention makes it possible to compare measurements performed on the same data at various points in the network, without data recognition being affected by propagation delays due to transmission and/or encoding and/or decoding.

BRIEF DESCRIPTION OF THE DRAWINGS

Other characteristics and advantages of the invention will appear more clearly on reading the following description, given by way of non-limiting example and with reference to the accompanying drawings, in which.

DETAILED DESCRIPTION

Figure 1:
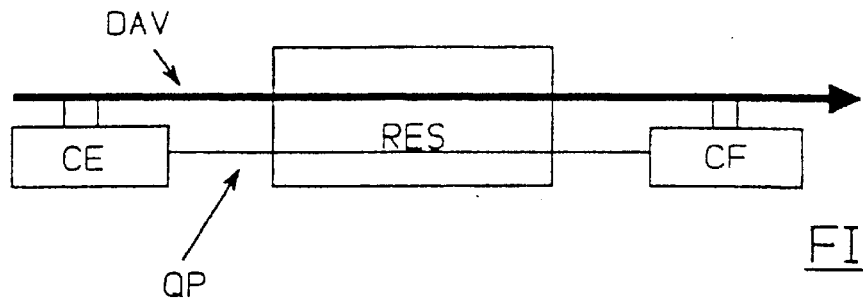
FIG. 1 is a block diagram showing monitoring at the inlet and at the outlet of a digital television network.

The MPEG-2 standard [ISO/IEC 13818-1] specifies how one or more elementary video, audio, and data streams are to be combined into a stream that is suitable for transmission or storage. That standard provides information which is sufficient and necessary for synchronizing presentation at the output from a video and audio signal decoder, and for ensuring that the buffer memories or "buffers" of the decoder neither empty nor saturate. This information is constituted by time stamps concerning decoding and presenting video and audio signals, and time stamps concerning the supply of the binary stream itself.

The timing model described in that standard is a model that provides a constant delay. This is the delay between a signal entering the encoder and the same signal leaving the decoder. It is due to the encoding, to the buffers of the decoder, and to the presentation at the outlet from the decoder. Thus, each image and each audio sample is presented once and once only. In this way, the time interval between two images remains fixed. Furthermore, the frequently at which the audio signal is sampled is the same at the inlet to the encoder and at the outlet from the decoder.

The function of the time stamps is to ensure that the delay is constant and that the video and audio signals at the outlet from the decoder are synchronized. In fact, they are represented as a counter which increments on each clock pulse of a time base (known as the "system time clock" or STC at 27 MHz in the standard).

The constant delay and synchronization of video and audio signals at the outlet from the decoder can be obtained providing the encoders save the time stamps. This applies when the time stamps are transmitted to the decoder together with the associated signals, and the decoder makes use of them for controlling the timing with which signals are presented at its outlet.

The main time stamps are as follows:

SCR ("system clock reference") for the program stream and PCR ("program clock reference") for the transport stream.

These time stamps encode the time base used for the video and audio DTS and PTS (duefined below) of a single program.

The STC time base is a 42-bit counter representing a clock operating at 27 MHz and the time stamps are encoded on 33+9 bits.

The SCR or the PCR are used in the decoder to regenerate the same STC time base as was used during encoding so as to ensure a constant delay.

The SCR or the PCR serves to regenerate a time base STC' in the decoder which can be the same time base STC as was used during encoding or which can be deduced unambiguously therefrom, so as to guarantee a delay that is constant.

DTS ("decoding time stamp"): this time stamp marks the instant at which an encoded signal block or "access unit" (AU) is presented at the inlet to the decoder. The time base is the preceding clock divided by 300 (thus giving a clock operating at 90 kHz), and this time stamp is encoded on 33 bits.

PTS ("presentation time stamp"): this time stamp marks the instant at which a decoded signal block or "presentation unit" is presented at the outlet of the decoder. The time base is the same clock as for the DTS (clock at 90 kHz), and this time stamp is encoded on 33 bits. The PTS must be present in each PES at least once every 0.7 seconds, and it is situated in the PES packet header.

It should be observed that the signals PTS and DTS represent time stamps relative to the STC time base. They do not correspond to absolute time (i.e. they specify neither the time of encoding nor the time of decoding).

The present invention seeks to make use of the time data present in an MPTS multiprogram digital transport stream, e.g. using the MPEG-2 system, for the purpose of supervising measurement equipment, and in particular equipment for measuring the quality of audiovisual signals, by labelling the measurements performed so as to make it possible to collate measurements that are performed on the same signals, but at various different points in the network.

The audiovisual signals are thus "dated" so as to make it possible at all points in the network to recognize the data regardless of the time delays introduced by transmission, encoding, and/or decoding the data, and to do so even in the event of pieces of transmission equipment being connected in cascade. This "dating" identifies a "date" in the broad sense of some event, thus making it possible to establish correspondence between various measurements relating to the same signals, and, in particular, thus making it possible to track the quality of signals as transmitted from the head of the network and all along the transmission chain. It also makes it possible to determine the position in time and to characterize an event, e.g. a disturbance, by means of its impact on the audiovisual signals as measured over the network. Such dating thus contributes to obtaining accurate knowledge about the overall quality of service of audiovisual broadcasting over the network.

Figure 2:
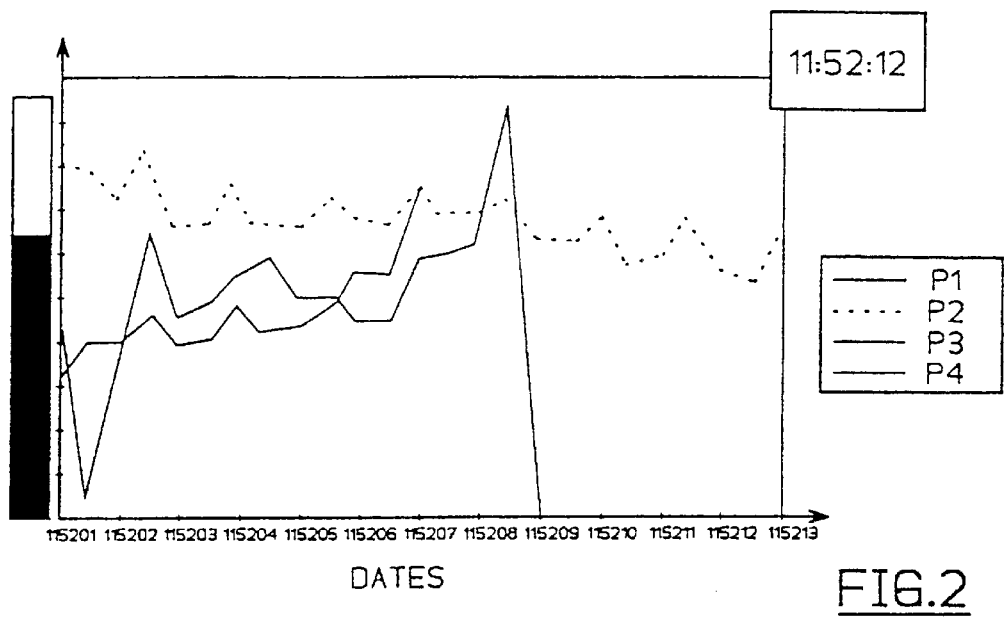
FIG. 2 shows an example of a "control panel" in a supervision system of the invention.

FIG. 2 shows an example of a control panel for a supervision system. In the invention, there exists a unified dating clock associated with the MPEG-2 signals. This advantageous characteristic contributes to automating quality-of-service management on digital television networks (P1 to P4: 4-measurement example).

Some quality measurements are comparative, e.g. in order to evaluate the transparency of all or part of the network. They perform two measurements at different locations on the network and compare them. For example, to quantify audio and video quality objectively, it is necessary in some approaches to perform a comparison. By way of example, this operation is performed between measurements performed at the beginning of transmission and other measurements performed at the last transmission link concerned. The measurements are performed respectively by measurement equipment that monitors the input (CE) and by measurement equipment that monitors the final quality (CF) of a digital television network RES (FIG. 1) serving to transmit audio-video data DAV. An auxiliary channel relays quality parameters QP as measured in one direction or the other between the equipments CE and CF so as to enable the parameters to be compared.

This approach requires accurate time synchronization between measurements performed at the inlet and those performed at the outlet. Consequently, it is necessary to ensure that the dating information associated with each measurement is true.

For this purpose, the method proposed by the present invention-enables dating information to be allocated to measurements performed on the network. Consequently, comparison is consolidated and made robust because of such synchronization. It suffices to ensure that the dating information corresponds.

This naturally applies to measurements performed at any point on a network regardless of whether the network uses terrestrial radio, cables, or indeed satellites.

Figure 3:
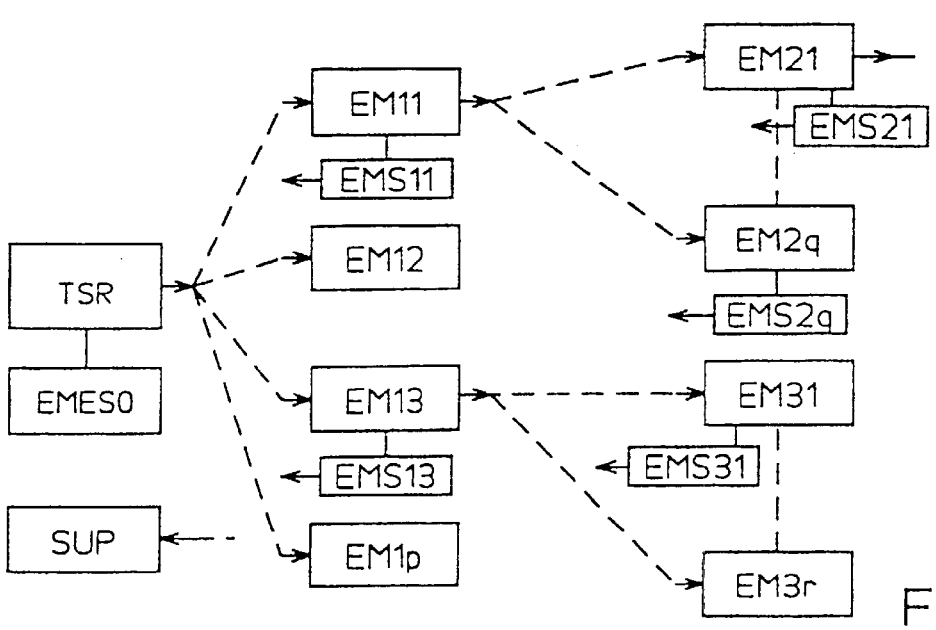
FIG. 3 shows an example of a measurement system of the invention.

FIG. 3 shows a network implementing transmissions that are performed in cascade starting from a network head TSR. The network has a first level of transmitters EM11 . . . EM1p which receive the signals delivered by the network head TRS and some of which forward the signals to second level transmitters, e.g. EM21 . . . EM28, or indeed EM31 . . . EM3r, and so on. Some of the transmitters, e.g. EM11, EM13, EM21, EM31 . . . , are associated with respective measurement equipments EMS11, EMS13, EMS21, EMS31. The network head transmitter TSR can also have measurement equipment EMESO. A supervisory installation SUP, e.g. located in the network head, receives the measurement signals transmitted by the various above-mentioned measurement equipments EMS, with the quality measurement information being dated in accordance with the invention. It is then possible to compare measurements that have been performed on the same data by causing the dating information to correspond, thus making it possible to track quality at any point in the network where that is considered to be desirable.

In the invention, the MPEG-2-TS stream is decoded to extract the time stamps associated with the audiovisual signals. Each measurement performed by monitoring equipment is associated with a time stamp which is associated in definitive manner therewith. Each data pair (date, quality measurement) is designed to be used by other monitoring systems and by the supervision system.

The invention is based on the idea of using a time stamp based on the content of a data stream, e.g. an MPEG-2 stream. Several kinds of data that can be included in the data stream have already been mentioned. They constitute examples of time references suitable for use in the context of the present invention.

The advantageous association of dates or time stamps with quality parameters (associated with the identity of a particular piece of measurement equipment) enables onward transmission to other measurement equipment and to a supervision system SUP. The data can then be used effectively for monitoring purposes. The measurements associated with dating measurements also contribute to analyzing incidents and decisions concerning quality of service in audiovisual broadcasting.

The supervision system is a tool for inspecting the network in terms of surveillance and correction, and it can also contain a monitoring data base. This information makes it possible to have a historical record of incidents that occur and that have affected the quality of service of audiovisual signal broadcasting. This knowledge also makes it possible to compare measurements performed on signals that come from different levels of the network. In addition, said signals can be of various different forms: RF signals, encoded and multiplexed digital data, and/or signal samples in baseband, etc.

Furthermore, the comparative monitoring equipments located at the final verification level serve to provide synchronization between the reference measurements and the final measurements. This operation is performed with the help of the dating data. The measurements and the associated dates make it possible to provide synchronization that enables comparative measurement methods to be implemented.

The invention consists in decoding the data stream, e.g. an MPEG-2-TS stream, so as to extract time stamp information MTS therefrom for dating measurements performed by quality monitoring equipment, e.g. for monitoring audio and video quality in digital TV.

When using the MPEG-2 standard, it is advantageous to make use of the PCR field or the SCR field contained in the MPEG-2-TS stream, or indeed the DTS field or the PTS field.

Figure 4:
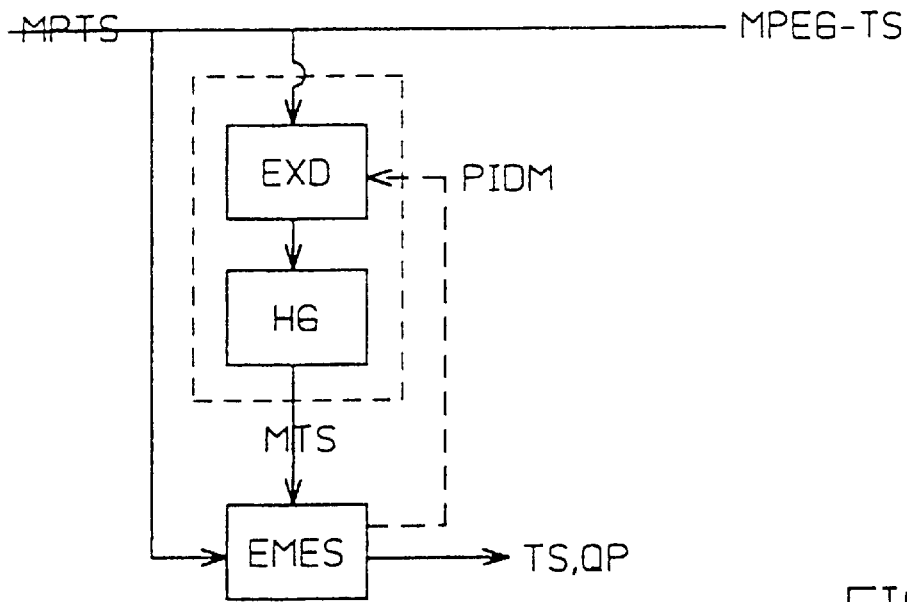
FIG. 4 is a block diagram showing how a device implementing the method of the invention operates.

The equipment is inserted in a digital television network as shown in FIG. 4.

A data extractor EXD receives the MPEG-TS multiprogram transport stream, possibly together with a PIDM signal representing the identity PID of the frames to be selected, with the signal PIDM being generated by the measurement equipment EMES.

In particular, the measurement equipment EMES includes an audio and video analyzer which processes the audiovisual signals in baseband and which measures the quality of said signals in such a manner as to output signals QP that represent the quality of the signals as measured by the equipment under consideration EMES.

The data extractor EXD decodes a field contained in the data stream, and the clock generator module HG produces a multibit clock signal TS which is used for dating the measurement signals QP.

The MPEG-2-TS stream includes time information for stamping digital data. The field PCR contained in the MPEG-2-TS frames makes it possible in particular to time stamp the data. On the basis of PCR, it is possible to generate STC, for example. It is a data time stamping counter STC' which counts on 42 bits to represent a clock at 27 MHz. The equipment decodes the MPEG-2-TS stream and marks the data as measured by the measurement equipment EMES using this time stamping counter.

In an embodiment of the invention, the MPEG-2-TS stream is decoded to extract PCR and synthesize STC in the form of a signal STC'=STC. It will be observed that transmission installations incorporate decoders, but that within such decoders intermediate decoding data remains internal and is not accessible. This STC data makes it possible to create time stamp data MTS. This operation makes it possible in the audio and/or video quality monitoring equipment to index measured quality parameters on the basis of the signal MTS.

A transport stream MPEG-2-TS frame contains various types of information. An MPEG-2-TS frame comprises 188 bytes in which there exist various special fields that enable an MPEG-2 decoder to find payload information.

In order to identify a given program, the packet identifier field PID is available on 13 bits.

The device can integrate a module for identifying a specific PID, preferably that of the video data associated with the program on which audio and video quality measurements are to be performed.

Figure 5:
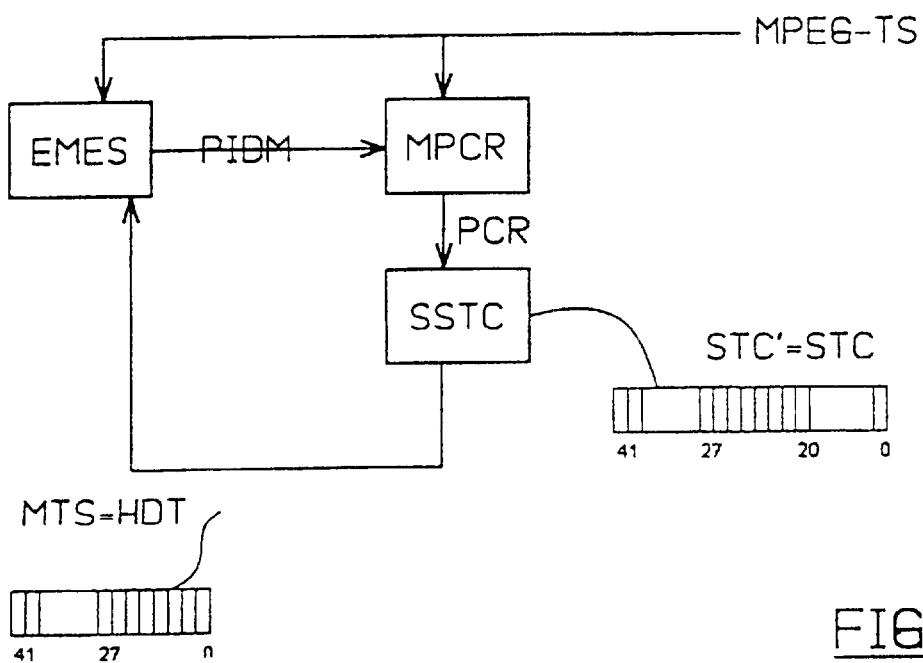
FIG. 5 shows an embodiment of the FIG. 4 device.

As shown in FIG. 5, the time stamp generator MTS comprises two functional modules.

A data extractor MPCR which enables the 188-byte frames to be recovered from the MPEG-TS stream, which frames are associated with the PIDM required by the measurement equipment EMES, and to generate the PCR (or SCR) field on the basis of the frames recovered in this way.

A clock generator module SSTC which generates the signals STC' on 42 bits on the basis of the signal PCR, as described below with reference to FIG. 7.

The signals MTS is preferably an HDT signal obtained by retaining only meaningful bits from the signals STC', i.e. specifically bits $b_n$ to $b_{41}$. $b_n$ is selected as a function of the periodicity of the measurements to be performed, e.g. for quality measurements performed once a second, it is possible to retain only bits $b_{25}$ to $b_{41}$ since the bit $b_{25}$ of the signal STC'=STC changes once every 0.73 seconds.

The field PCR occupies 42 bits in each frame (33 base bits, 6 reserved bits, 9 extension bits). The extractor MPCR for extracting the signal PCR initially tests the flag signalling the presence of PCR in each frame under consideration and extracts therefrom the 42-bit information. This information represents the refreshing of the internal digital clocks of the encoders and decoders that is operated at the frequency of 27 MHz. The information PCR does not appear regularly in the data stream. The MPEG-2 standard requires the time between two frames containing PCR information to be no greater than 100 ms, but this does not present any significant drawback since this signal is used solely for setting the phase of the signal STC.

Figure 6:
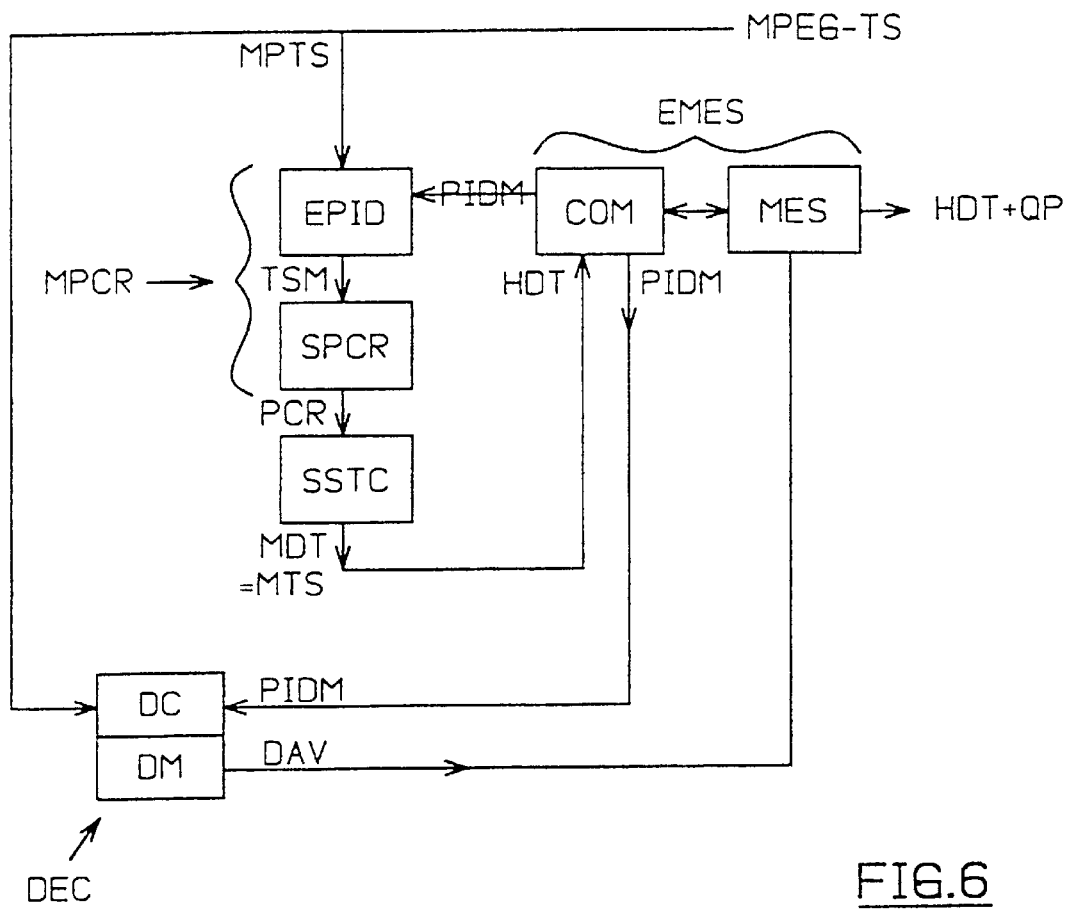
FIG. 6 shows a preferred embodiment of the FIG. 5 device.

As shown in FIG. 6, the module MPCR has a sub-module SPCR and a sub-module EPID which demodulates the MPEG-TS steam and outputs the frames TSM that are selected as a function of PIDM. The sub-module SPCR applies a filter to these frames to detect the flags marking the presence of the signal PCR which is reproduced at the output from the sub-module SPCR. The decoder DEC has a sub-module DC that performs the decoding function proper and a sub-module DM that generates the data DAV. The decoder sub-module DC also receives the signal PIDM to select the frames on which measurement is to be performed in the preferred case where these frames are identical to the frames selected for reproducing the signal STC. The measurement equipment includes a communications sub-module COM and a measurement sub-module MES. The sub-module COM supplies the signals PIDM to the sub-modules EPID and DC, it receives the signal MTS, and it transmits it to the measurement sub-modules MES. From the frames selected on the basis of the signal PIDM, the sub-module DM of the decoder delivers the audio-video data DAV in baseband to the measurement sub-module MES which outputs measurement signals QP that identify the particular measurement equipment EMES and that are also labelled using the signal HDT (=MTS).

To control the audio and video quality measuring equipment, a stable clock signal STC is generated at 27 MHz. To synthesize STC clocked by the 27 MHz clock compatible with the MPEG-2 standard, the module shown in FIG. 4 uses values of PCR and a servo-control loop (VCO) for controlling the phase of a clock at the frequency of 27 MHz to generate the signal STC. The principle on which STC synthesis relies is that of using a 27 MHz phase-locked loop for providing the original values of STC at the rate of 27 MHz on the basis of the values of PCR.

Figure 7:
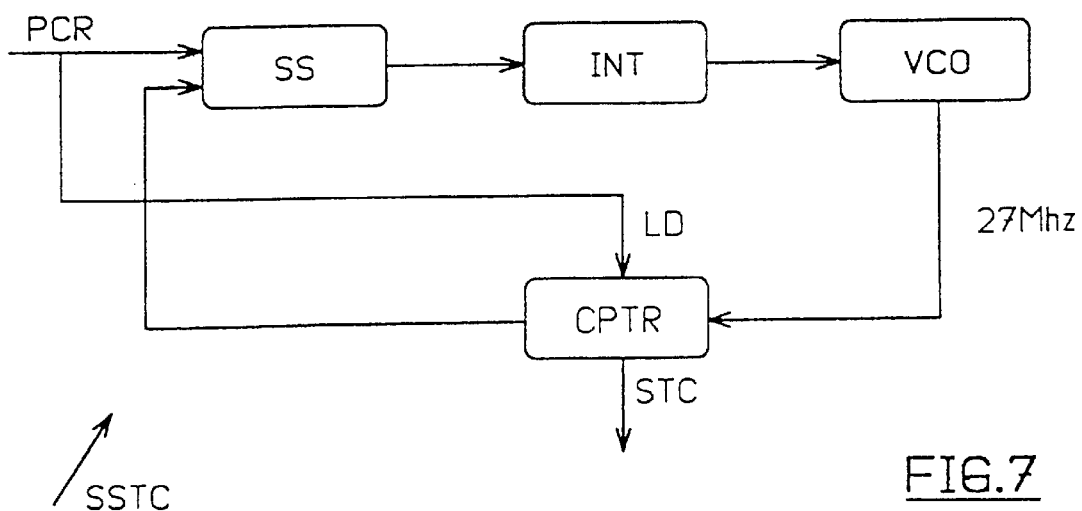
FIG. 7 shows the phase lock loop of the SSTC module.

To this end, and as shown in FIG. 7, the signal PCR as output from the sub-module SPCR is applied to one of the inputs of a subtracter SS whose output is fed to an integrator INT whose output is in turn fed to the phase control input of a phase-locked 27 MHz clock. The output from this clock VCO increments a counter CPTR. The signal PCR is applied to the load input LD of the counter CPTR. Each time the signal PCR occurs, the value of the counter CPTR, after loading, is compared with the value of PCR in the subtracter SS, and the result of this comparison as present at the output from the subtracter SS, enables said phase locking to be provided.

The stream of STC values is too large compared with the frequency at which audio and video quality measurements are performed by the analyzers. Time stamps are used that are referenced relative to the frequency at which it is desired to perform measurements.

The rate at which the least significant bits vary is generally too fast compared with the measurement frequently. The least significant bit $b_0$ changes every 37 ns, the next bit $b_1$ changes every 74 ns, and so on. Consequently, the less significant bits of the counter are not useful. It is therefore possible to retain in the signal MTS, e.g. HDT, only those bits which are required for identifying the measurements.

At the less significant bit end, it therefore suffices to keep bits down to the first bit that varies more quickly than the periodicity of the measurements.

At the more significant bit end, it suffices to retain a number of bits that is sufficient for distinguishing between two series of measurements on the same data while taking account of the time T required for propagating and collating the measurement data. For example, for a time T equal to 3 seconds, it can be considered that it suffices to retain as the most significant bit the bit $b_{28}$ which varies once every 5.8 seconds. Labelling can be performed, for example, on the basis of bits $b_{25}$ to $b_{28}$.

The signal MTS serves to control equipments for measuring the quality of audio and/or video signals in other apparatuses for monitoring MPEG-2 signals, by triggering the measuring process and consequently labelling the corresponding measurements with values of HDT. This operation advantageously makes it possible to compare measurements performed on the same data at various different points in the network.

The present invention is applicable to operating monitoring equipment and to systems for supervising networks for broadcasting digital television signals. One of its advantageous characteristics lies in associating measurements performed on network signals with a unified date associated with the audiovisual signals. Another advantage lies in extracting a reference clock on the basis of data included in an MPEG-2 stream.

The means and devices implemented in this invention provide a favorable response to the requirements of systems for managing quality of service.

What is claimed is:

1. A method of measuring the quality of digital television signals comprising a data stream, said method including measuring quality and producing measurement signals representative of the quality of at least some of the data of the data stream, and said method comprising the following steps:
   a) selecting a reference time signal (PCR) from the data stream;
   b) generating a multibit digital clock signal (STC') on the basis of the reference time signal, with the phase of the clock signal being locked on the basis of said reference time signal (PCR), and with the count thereof being deduced unambiguously from the count of a time base (STC) generated during initial encoding of the digital television signals; and
   c) labelling said measurement signals using at least some of the bits (HDT) of the digital clock signal, that are meaningful given the nature of the measurements performed.

2. A method according to claim 1, wherein the count of the multibit digital clock signal (STC') is equal to the count of said time base (STC).

3. A method according to claim 1, wherein step a) comprises the following sub-steps:
   $a_1$) selecting digital frames corresponding to video data associated with a program from said data stream; and
   $a_2$) selecting said reference time signal from said frames.

4. A method according to claim 3, wherein the digital television signals are in the MPEG-2 standard and during step $a_1$), frames are selected on the basis of a PID field.

5. A method according to claim 4, including a step of decoding video data from frames selected on the basis of said PID field.

6. A method according to claim 3 wherein the video data is the data on which audio and/or video quality measurements are performed.

7. A method according to claim 1, wherein said selection of the reference time signal is performed by testing a flag indicating the presence of said reference time signal in each frame under consideration.

8. A method according to claim 1, wherein the digital television signals are in the MPEG-2 standard, and the reference time signal is selected from the group comprising the signal PCR, a signal SCR, a signal DTS, and a signal PTS.

9. A method according to claim 8, wherein during step b), said digital clock signal is at a frequency of k×27 MHz where k is a non-zero integer or fraction.

10. A system for measuring the quality of signals in a digital television network having a plurality of transmission installations, the system including a plurality of measurement equipments (EMS11, EMS13, EMS21 . . . ) associated with at least some of the transmission installations (EM11, EM13, EM21), and each of which comprises:

an identifier device receiving a data stream as input and outputting a reference time signal selected from the data stream;

a clock generator whose phase is locked on the basis of said reference time signal and which outputs a multibit digital clock signal (STC) operating at a given frequency, and whose count is deduced unambiguously from the count of a time base (STC) generated while encoding digital television signals;

a device for labelling quality measurements using at least the meaningful bits (HDT) of the multibit digital clock signal (STC'); and a device for transmitting the labeled quality measurements: and including a receiver (SUP) for collecting the labelled measurement data transmitted by at least one of said transmission installations.

11. A system according to claim 10, wherein the count of the multibit digital clock signal is equal to the count of said time base.

* * * * *

UNITED STATES PATENT AND TRADEMARK OFFICE
CERTIFICATE OF CORRECTION

PATENT NO.    : 6,366,314 B1
DATED         : April 2, 2002
INVENTOR(S)   : Goudezeune et al.

It is certified that error appears in the above-identified patent and that said Letters Patent is hereby corrected as shown below:

Column 10,
Line 1, "(STC)" should read -- (STC') --.

Signed and Sealed this

Eleventh Day of June, 2002

Attest:

Attesting Officer

JAMES E. ROGAN
*Director of the United States Patent and Trademark Office*